United States Patent

Gagliardi

[11] 4,370,091
[45] Jan. 25, 1983

[54] REMOTE MANIPULATOR ARM
[75] Inventor: Georges Gagliardi, Clamart, France
[73] Assignee: Ateliers et Chantiers de Bretagne, Nantes, France
[21] Appl. No.: 170,239
[22] Filed: Jul. 18, 1980
[30] Foreign Application Priority Data
Jul. 18, 1979 [FR] France ............... 79 18646
[51] Int. Cl.³ .................... B25J 11/00; G21F 7/06
[52] U.S. Cl. .................... 414/735; 414/4; 414/738
[58] Field of Search .......... 414/4, 735, 738–741, 414/680; 285/12, 168; 403/205, 403, 174, 170, 3

[56] References Cited
U.S. PATENT DOCUMENTS

| | | | |
|---|---|---|---|
| 2,609,638 | 9/1952 | Lindenmeyer | 403/174 X |
| 3,155,240 | 11/1964 | Eude | 414/739 |
| 4,012,153 | 3/1977 | Pidgeon | 403/170 |
| 4,076,429 | 2/1978 | Berkowitz | 403/3 X |
| 4,089,427 | 5/1958 | Pardo | 414/680 |

Primary Examiner—Douglas C. Butler
Assistant Examiner—Terrance L. Siemens
Attorney, Agent, or Firm—Sughrue, Mion, Zinn, Macpeak & Seas

[57] ABSTRACT

A remote manipulator arm interconnects a manipulator tool (13) to a support (1). The arm comprises three independent motorized arm components (7,17 and 11). Conventional arm components are arranged for end-to-end coupling with a fixed end coupling at one end and articulated coupling disposed in a fork (10) at the other end. The present invention provides at least one intermediate component (17) which further includes at least one fixed coupling (21) arranged at 90° to its end coupling. Such a right-angled component provides greater flexibility in the design of a remote manipulator arm assembled from such components.

5 Claims, 11 Drawing Figures

REMOTE MANIPULATOR ARM

FIELD OF THE INVENTION

The invention relates to a remote manipulator arm of the type comprising an articulated assembly connecting a manipulator to a support, the said articulated assembly being built up from standard independent components interconnected by articulations capable of transmitting independent movements in order to achieve a predetermined movement of the said manipulator with respect to the said support. Such manipulator arms are described in French Pat. No. 1 459 250, and the inventor of the present invention is named as one of the inventors therein.

BACKGROUND OF THE INVENTION

One of the most important applications of such manipulator arms is in providing remote power manipulators for laboratories using highly radioactive materials. The radioactive environment imposes many constraints on the design of manipulator arms affecting both their design and their performance. In particular, users seek as many degrees of freedom, as many relative configurations, and as great a capacity as possible for load bearing and/or reach. Nonetheless, it is necessary that such performance does not lead to excessive increase of the radial extent and the weight of the assembly, since these parameters are also important.

Preferred embodiments of the present invention improve the design of prior manipulator arms by improving their load performance and reducing their radial extent, while retaining the other advantages of the prior art. These designs seek to combine as far as possible the advantages of arms comprising a linkage of two standard arm components with those of arms comprising a linkage of three standard arm components.

SUMMARY OF THE INVENTION

The present invention provides a remote manipulator arm comprising an articulated assembly connecting a manipulator to a support. The articulated assembly built up from a plurality of independently motorized arm components each of which comprises at least one motor and an elongate body equipped with an axially-directed fixed coupling at one end with a moving portion at its other end. The moving portion is caused to move relative to the body under the control of said at least one motor, and is constituted, in the case of an end component, by said manipulator, and in the case of any other arm component by a moving coupling for connection to the fixed coupling of an adjacent arm component. The support is equipped with a moving coupling for connection to the fixed coupling of the first arm component of the articulated assembly. At least one of said arm components also includes at least one intermediate fixed coupling located on the side of the body between its ends and directed at 90° to the axis of the body. The intermediate fixed coupling is interchangeably useable with the end fixed coupling for connection to a moving coupling, thereby providing an arm component capable of being arranged in the articulated arm assembly in at least two different configurations relative to the moving coupling to which it is connected.

Preferably, the manipulator arm provides at least one of the following features.

At least one of the arm components has two intermediate couplings arranged about mutually perpendicular axes, thereby providing two types of rigid sideways connection at one of two desired relative angular positions between the components connected thereby.

At least one of the arm components includes an intermediate coupling unit fixed on a girth ring arranged around the body of the component and capable of rotating thereabout. Rotation of the said girth ring about the longitudinal axis of the said component provides multiple configurations of rigid sideways coupling depending on the angular position of the girth ring.

For an arm comprising three arm components of which the first arm component is connected to a support, the second arm component includes an intermediate coupling and the third arm component is an end component bearing a manipulator. The coupling between the first and second arm components is a rigid sideways connection at 90° providing by the intermediate coupling on the second arm component, while the couplings between the support and the first component, and between the second component and the third component are in a conventional end-to-end configuration.

The invention also provides an arm component including an intermediate fixed coupling as defined above in relation to the arm assembly as a whole.

Other characteristics and advantages of the invention will appear more clearly from the following description given by way of example of no limiting character with reference to the accompanying drawings.

DESCRIPTION OF PREFERRED EMBODIMENTS

Figure 1:
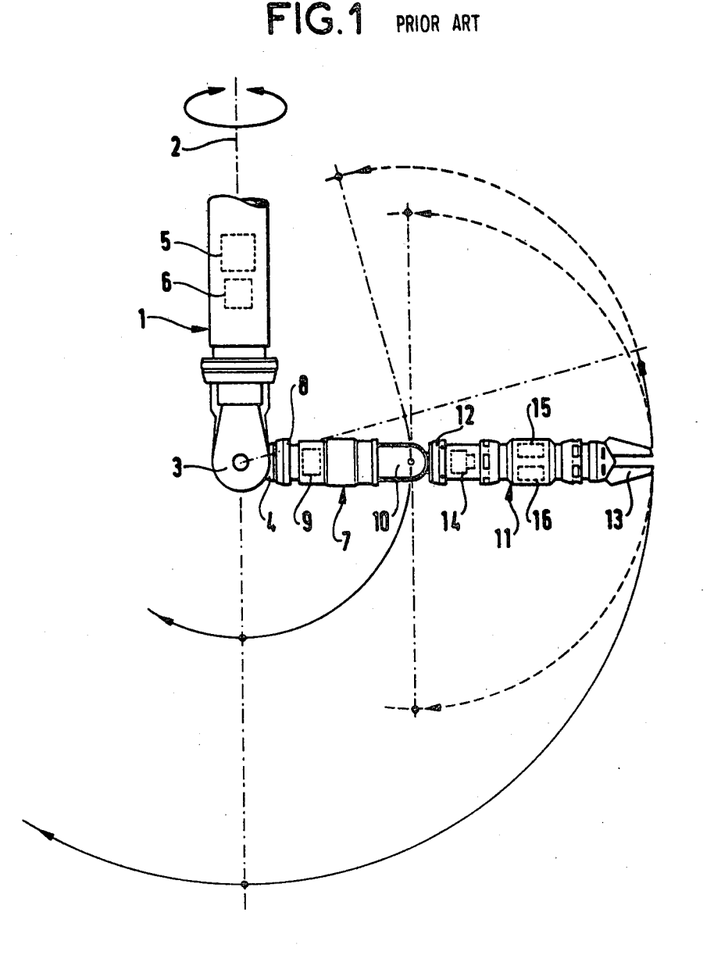
FIG. 1 is a diagrammatic elevation of a prior art manipulator arm having two standard arm components.

FIG. 1 shows a conventional remote manipulator arm with two arm components. It comprises a support component 1 which is disposed vertically in use and is arranged to rotate about its axis 2. The lower end of the support component 1 comprises a shoulder 3 with an articulated coupling portion 4 for connection to the following arm component. The support component 1 includes a motor represented at 5 for controlling its rotation about the vertical axis 2 and a motor outlined at 6 for controlling rotation of the coupling portion 4, and hence of the remainder of the arm downstream therefrom. A standard and independent basic component 7 is connected to the coupling portion 4 of the support component by a ring nut 8. The basic component is independent in that it includes a motor 9 controlling the rotation of its own downstream end in a fork 10, thus controlling rotation of the remainder of the arm downstream from the fork. The following component is a manipulator component 11 in this case, but could alternatively be a further basic arm component identical to the basic component 7 to provide an arm having three arm components. The component 11 is likewise standard and independent and is connected to the articulated portion of the preceding arm component by a ring nut 12. At its free end there is a manipulator, in this case a pincer tool 13. The manipulator component 11 is independent in the sense that it includes a motor 14 controlling rotation of the tool 13 about the axis of the component, a motor 15 controlling opening and closing of the tool, and a motor 16 controlling telescopic extension and retraction of the tool. The couplings between the arm components, in addition to providing mechanical connection, also provide pneumatic and/or electrical connection enabling overall control of the manipulator arm movements from outside a sealed work enclosure.

Such arms are already in use and generally have a load capacity of about 100 kg for a two component arm and 50 kg for a three component arm. Further, articulated movement is only possible in vertical planes, as shown in FIG. 1 by faint lines.

The aim of the invention is to improve capabilities of the arm shown in FIG. 1 by providing at least one arm component of special design.

In accordance with the invention, at least one of the components is provided with at least one intermediate coupling for providing a rigid 90° side coupling with the end of another component adjacent thereto. The said intermediate coupling provides the same capabilities of relative movement between components connected thereby as does an end coupling. This design thus makes it possible to vary the number of components and their relative disposition in such a manner as to obtain minimum bulk and to obtain different arrangements of articulation axis with respect to each other depending on the desired end use. Further, by reducing the overall bulk and by balancing the moving masses, it is possible to improve the lifting performance by using a more compact arrangement since the intermediate coupling shortens the lever arm, thereby providing greater flexibility in dealing with a wide range of problems.

Figure 2:
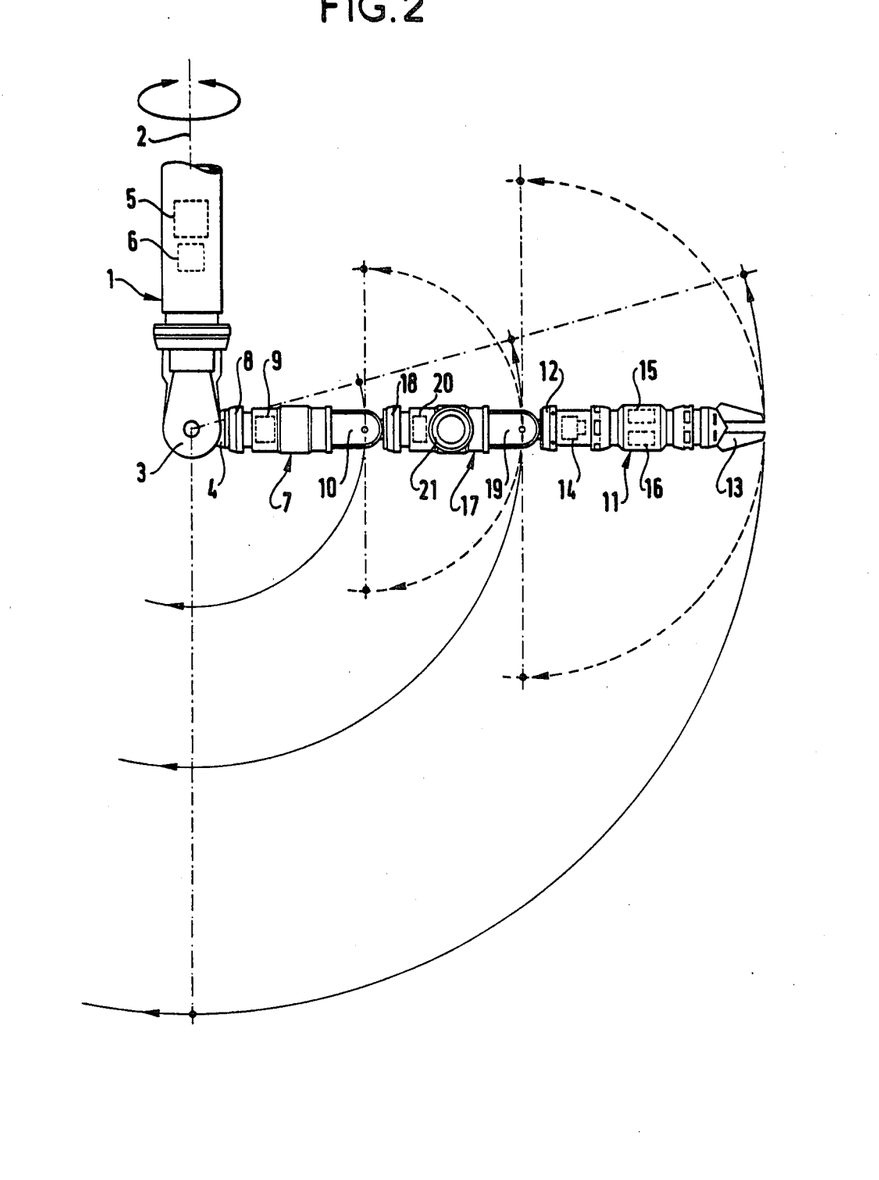
FIG. 2 is a diagrammatic elevation of a manipulator arm in accordance with the invention, having three standard arm components including one intermediate arm component of special design, but with the arm arranged in a conventional in-line configuration.

In FIG. 2 a manipulator arm in accordance with the invention comprises a support component 1, a basic component 7 and a manipulator component 11 that are identical to those described with reference to FIG. 1. However, it also includes an intermediate basic component 17 of special design. Thus, in addition to an upstream ring nut 18, a downstream coupling fork 19, and an independent motor 20 controlling rotation of the downstream arm component, the intermediate basic component 17 also includes an intermediate unit 21 for providing a rigid side coupling at 90°. The in-line assembly shown in FIG. 2 is entirely conventional, and merely serves to illustrate the possibility of including an intermediate component 17 in an end-to-end arrangement of an existing installation. Naturally the assembly shown in FIG. 2 does not offer the advantages mentioned below that can be obtained using a right-angled configuration.

In particular it should be noted that as for the conventional arm, the arm assembly shown in FIG. 2 is capable of articulated motion only in vertical plane.

Figure 3A:
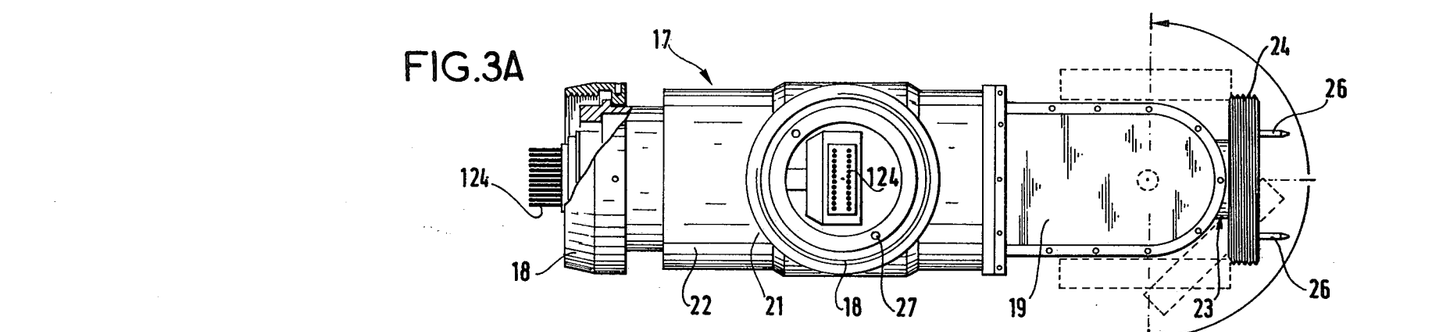
FIGS. 3A and 3B are two partially cut-away views on a larger scale showing details of the design of the special intermediate arm of the FIG. 2.
Figure 3B:
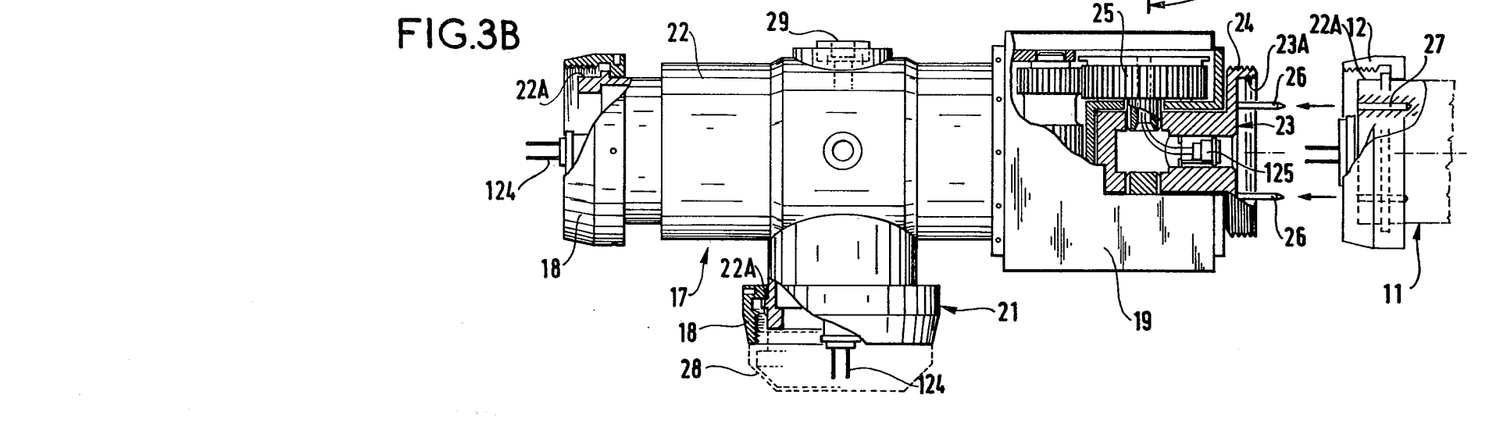

The intermediate arm component 17 is shown in greater detail in FIGS. 3A and 3B. It essentially comprises a body 22 terminated at one end by the ring nut 18 and at the other by the coupling fork 19 in which a coupling portion 23 is articulated. The body houses a conventional motor reduction gearbox assembly including a friction-based mechanical torque limiter (providing long-life since it only operates when the predetermined torque is exceeded). The motor/gearing assembly also includes such means to enable the arm to go limp for extraction from the work chamber in the event of a breakdown. In this example, control is by way of electrical connection only (which is more economical from the point of view of energy consumption) and the connection is by way of male connectors 124 (associated with the ring nut) and female connectors 125 (associated with the coupling fork). The mechanical coupling is very simple, and merely comprises screwing the nut over the corresponding threaded part 24 of the coupling portion 23, after initially engaging guide pins 26 in corresponding blind holes 27 followed by engaging the end 22A of the body 22 in a sealing ring 23A, with electrical connection being achieved simultaneously. The moving portion 23 is moved by the last gear wheel 25 of a gear chain in known manner. In accordance with the invention the body of the component 17 also has an intermediate coupling 21 provided with a ring nut 18 and a male electrical connector 124 in a manner similar to the end coupling, whereby a standard component can be directly connected thereto via its coupling fork, thereby obtaining a rigid sideways connection at 90°. A protective cap 28 may be provided over the coupling 21 while not in use, e.g. when assembled in an in-line arrangement. 29 points to a diagrammatic representation of the external outlet of the clutch device, which in this example is constituted by the torque limiter (not shown).

Figures 4A, 4B:
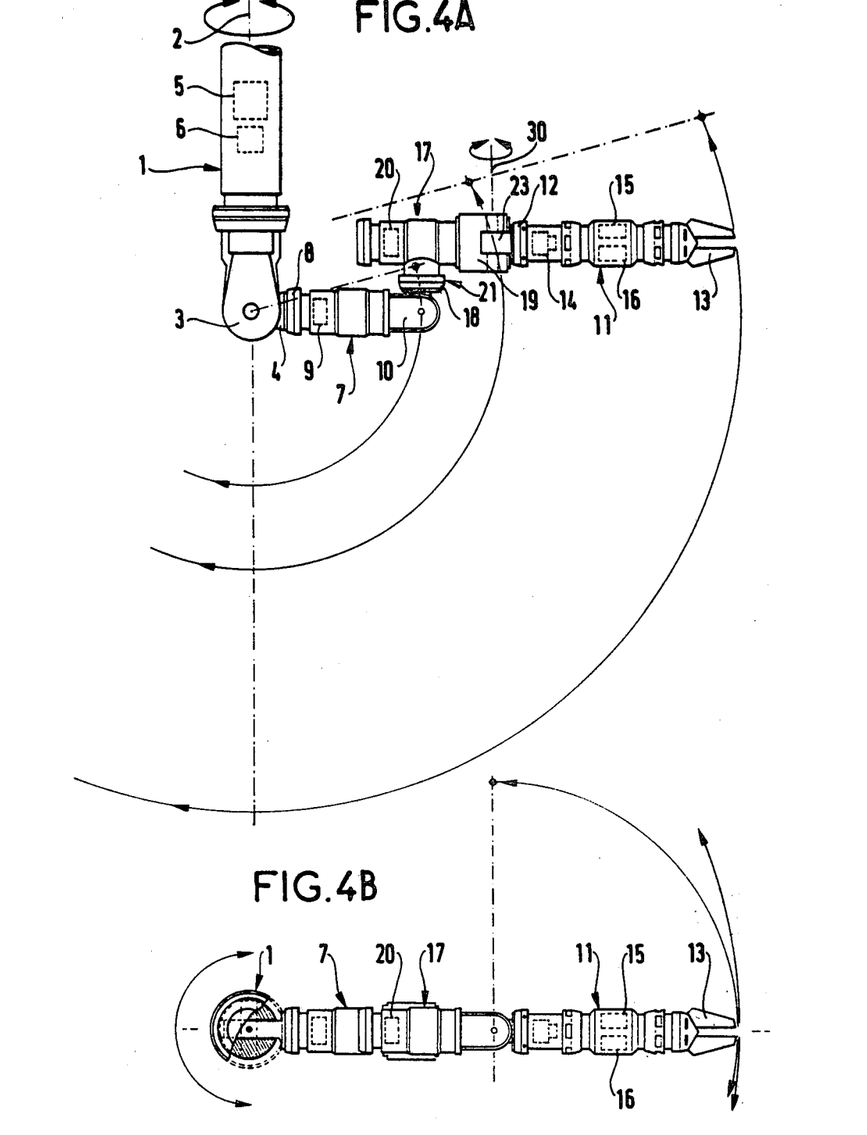
FIGS. 4A and 4B are an elevation and a plan view respectively, of the manipulator arm of FIG. 2 assembled in a completely novel right-angle configuration.

FIGS. 4A and 4B illustrate a right-angled connection of an arm in accordance with the invention, as made possible by the intermediate coupling 21 provided on the arm component 17. The intermediate component 17 is free to move in a vertical plane relative to the basic component 7, while the manipulator component 11 is free to move in a horizontal plane about a vertical axis 30 relative to the intermediate component 17. This movement about the vertical axis 30, which was not obtainable with prior art manipulators, can be very useful in combination with rotation of the support 1 about its axis 2. Further, the center of gravity of the arm component 17 is moved closer to the axis 2 than in the configuration of FIG. 2. Thus the distance between the main articulation and the load in the pincer is reduced, thereby giving rise to greater lifting power, giving a three component arm practically the same lifting power as a prior two component arm.

It should also be observed that this configuration has the further advantage of avoiding direct loading of the articulation between the intermediate component and the manipulator component while loads are being transported, thereby further increasing the capability of the arm.

Figure 5:
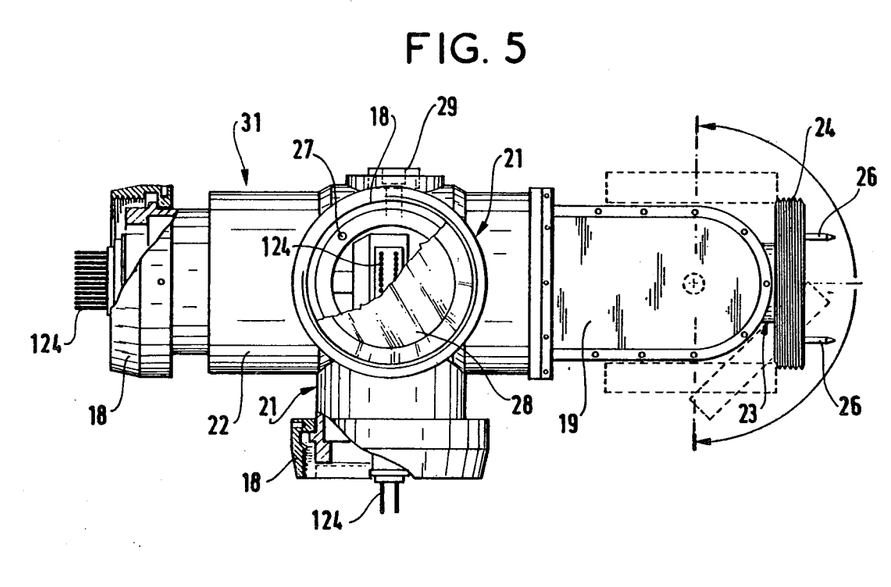
FIG. 5 is a partially cut-away view on a larger scale showing details of a variant design for the intermediate arm component, which in this case has two sideways coupling units.
Figure 6A:
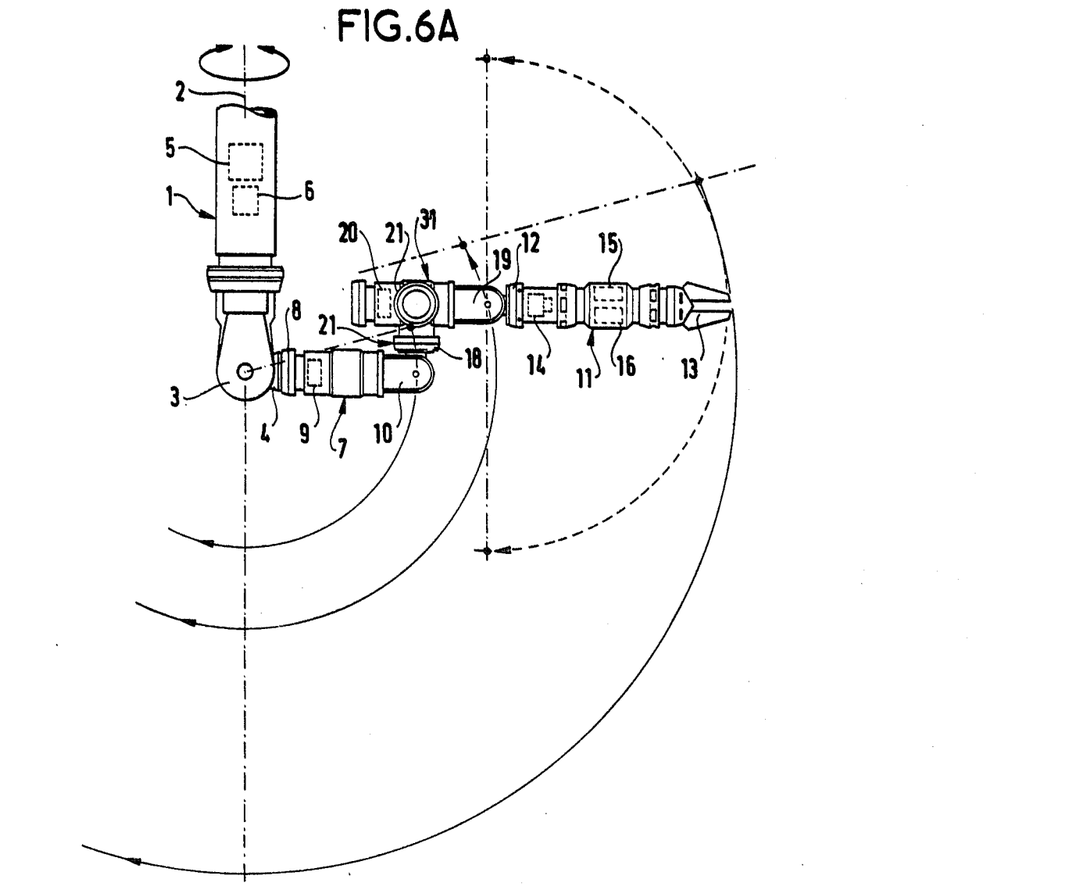
FIGS. 6A and 6B are an elevation and a plan view respectively of a manipulator arm including the intermediate arm component having two sideways couplings as shown in FIG. 5, in one of its two possible right-angled configurations.
Figure 6B:
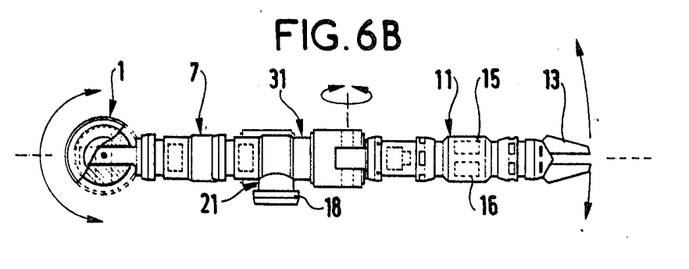

The principal that has just been described can be improved by providing an intermediate component with two intermediate coupling units, about mutually perpendicular axes. This makes it possible to assemble two types of rigid side coupling depending on the desired relative angular positions of the components thus connected. A component of this type is shown in FIG. 5. The body 22 now has two identical side coupling units 21, which are preferably at 90°. This component can either be assembled in a right-angled configuration as shown in FIGS. 4A and 4B to give two vertical articulations and one horizontal articulation, or else it can be assembled in the right angled configuration of FIGS. 6A and 6B giving three vertical articulations. In this latter configuration, all the articulation axes are again parallel, but nonetheless, since such an assembly is shorter than that shown in FIG. 2, it provides increased lifting capacity as in the case illustrated in the FIGS. 4A and 4B.

Figure 7A:
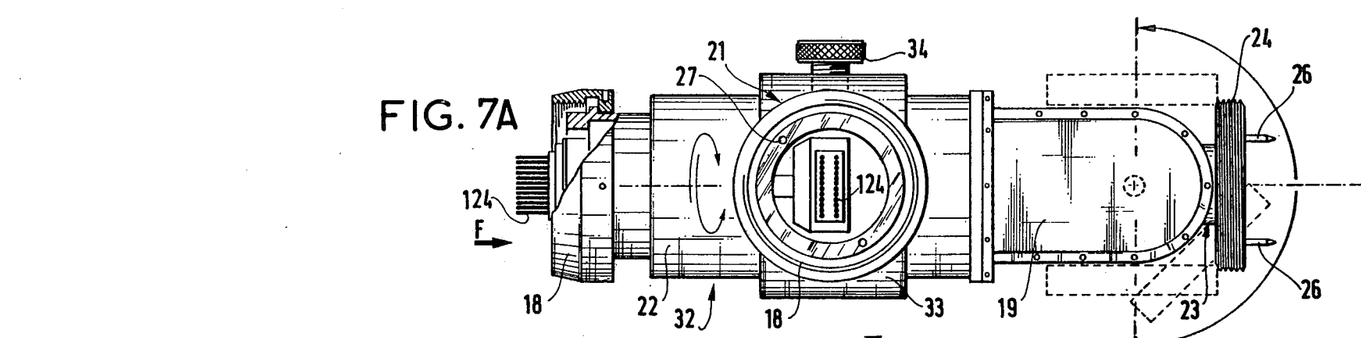
FIG. 7A is a partially cut-away view on a larger scale showing a further design variant of the intermediate arm component, which in this case includes a moving girth ring to which a single sideways coupling unit is fastened.
Figure 7B:
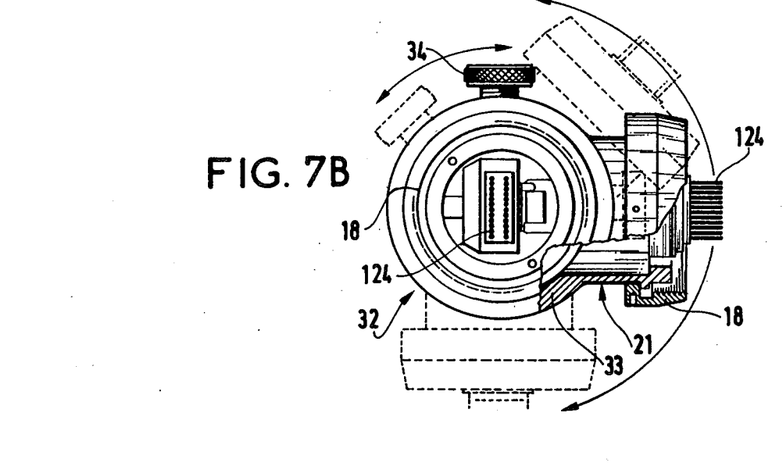
FIG. 7B is an end view along an arrow F of the component shown in FIG. 7A.

The above principal can be further generalised, providing more options for arm assembly, by providing an intermediate component with a side coupling unit mounted on a girth ring around the components and capable of rotating thereabout. It is thus possible to provide a rigid side connection at any desired angle about the longitudinal axes of the intermediate component. A component 32 of this type is shown in FIGS. 7A and 7B. The body 22 is surrounded by a moving girth ring 33 to which a side coupling unit 21 of the type described above is fastened. The angular position of the coupling unit relative to the body can be set by an external member 34, whereby a plurality of intermediate positions can be devised using a single coupling unit (clearly sufficient slack will have to be provided for the electrical connections to ensure that rotation over a useful angle, e.g. 90°, is possible).

The manipulator arm in accordance with the invention should naturally be provided with various safety devices to overcome different kinds of breakdown and loss of use of some component at whatever level along the arm it may occur. These safety devices are conventional and well-known to the person in the art. Likewise any kind of power supply can be chosen, for example: pneumatic, electrical, hydraulic, or even a mixture thereof (say electrical for all movements other than pincer movement and pneumatic for the pincer).

I claim:

1. A remote manipulator arm comprising an articulated assembly connecting a manipulator to a support, said articulated assembly being built up from a plurality of independently motorized arm components each of which comprises at least one motor and an elongate body equipped with an axially-directed fixed coupling at one end and with a moving portion at its other end, said moving portion being caused to move relative to the body under the control of said at least one motor, and being constituted, in the case of an end component, by said manipulator, and in the case of any other arm component by a moving coupling for connection to the fixed coupling of an adjacent arm component, said support being equipped with a moving coupling for connection to the fixed coupling of the first arm component of the articulated assembly; the improvement wherein at least one of said arm components further comprises at least one intermediate fixed coupling located on the side of its body between its ends and directed at 90° to the axis of the body, said intermediate fixed coupling being identical to the axially directed fixed coupling of said one arm component interchangeably useable with the fixed end coupling connection to a moving coupling of another arm component thereby providing an arm component capable of being arranged in the articulated arm assembly in at least two different configurations relative to the moving coupling to which it is connected reducing the distance between the main articulation and the load borne by the manipulator thereby giving rise to a greater lifting power and providing a three component arm with practically the same lifting power as prior two component arms.

2. An arm according to claim 1, wherein said at least one arm component has two intermediate couplings arranged about mutually perpendicular axes, thereby providing two types of rigid sideways connection at one of two desired relative angular positions between the components connected thereby.

3. An arm according to claim 1, wherein said at least one arm component includes a girth ring arranged around the body of the component and capable of rotating thereabout, an intermediate coupling unit fixed on said girth ring, and means for rotating said girth ring about the longitudinal axis of said component providing multiple configurations of rigid sideways coupling depending on the angular position of said girth ring.

4. An arm according to claim 1, wherein said arm components comprise three in number and wherein the first arm component is connected to a support, the second arm component includes an intermediate coupling and the third arm component is an end component bearing a manipulator and wherein the coupling between the first and second arm components is a rigid sideways connection at 90° provided by the intermediate coupling on the second arm component, while the couplings between the support and the first component, and between the second component and the third component are in a conventional end-to-end configuration.

5. An arm component for use in a remote manipulator arm according to claim 1 or claim 4, wherein said arm component comprises a motor and an elongate body equipped with an axially-directed fixed coupling at one end, with a moving coupling at its other end, said moving coupling being caused to move relative to the body under the control of said motor, and with an intermediate fixed coupling located on the side of the body between its ends and directed at 90° to the axis of the body, said intermediate fixed coupling being interchangeably useable with an end fixed coupling for connection to a moving coupling on a different member.

* * * * *